(12) United States Patent
Guan et al.

(10) Patent No.: US 12,415,216 B1
(45) Date of Patent: Sep. 16, 2025

(54) WATER-MIST-PENETRATING TEMPERATURE MEASUREMENT SYSTEM AND METHOD FOR STEEL HOT ROLLING

(71) Applicant: SHANGHAI JIAO TONG UNIVERSITY, Shanghai (CN)

(72) Inventors: Xinping Guan, Shanghai (CN); Xiaojing Wen, Shanghai (CN); Tiankai Jin, Shanghai (CN); Yanzhou Zhang, Shanghai (CN); Kaijie Wu, Shanghai (CN); Cailian Chen, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 19/074,054

(22) Filed: Mar. 7, 2025

(30) Foreign Application Priority Data

Jan. 21, 2025 (CN) .......................... 202510098165.5

(51) Int. Cl.
| | | |
|---|---|---|
| *G01J 5/48* | (2022.01) | |
| *B21B 38/00* | (2006.01) | |
| *G01K 11/14* | (2006.01) | |
| *G01K 13/06* | (2006.01) | |
| *G01J 5/00* | (2022.01) | |

(52) U.S. Cl.
CPC ............ *B21B 38/006* (2013.01); *G01K 11/14* (2013.01); *G01K 13/06* (2013.01); *G01J 5/0022* (2013.01); *G01J 2005/0029* (2013.01); *G01J 5/004* (2013.01); *G01J 2005/0077* (2013.01)

(58) Field of Classification Search
CPC ...... B21B 38/006; G01K 11/14; G01K 13/06; G01J 5/0022; G01J 5/004; G01J 2005/0029; G01J 2005/0077
See application file for complete search history.

(56) References Cited

U.S. PATENT DOCUMENTS 5,780,857 A * 7/1998 Harju ............... G01N 27/44721
250/458.1
9,255,526 B2 * 2/2016 Hatcher, Jr. ............... F02C 9/00

FOREIGN PATENT DOCUMENTS

JP H0530741 * 4/1993 ............... G01J 5/00

* cited by examiner

*Primary Examiner* — Rebecca C Bryant
(74) *Attorney, Agent, or Firm* — Fitch, Even, Tabin & Flannery LLP

(57) ABSTRACT

A water-mist-penetrating temperature measurement system and method for steel hot rolling, the system including a water-mist-penetrating temperature measurement device, and the water-mist-penetrating temperature measurement device including a visible light guiding-tracking assembly, an optical focusing assembly, a dual-wavelength beam splitting assembly, a multi-source information processing assembly, and a display assembly; and the method including the steps of obtaining a dual-wavelength radiation signal and a visible light image signal of the object to be measured, processing the obtained dual-wavelength radiation signal and the visible light image signal, and detecting and processing an abnormally fluctuated temperature data.

19 Claims, 4 Drawing Sheets

WATER-MIST-PENETRATING TEMPERATURE MEASUREMENT SYSTEM AND METHOD FOR STEEL HOT ROLLING

FIELD OF THE INVENTION

The present application relates to the field of steel production, and in particular to a water-mist-penetrating temperature measurement system and method for steel hot rolling.

DESCRIPTION OF THE PRIOR ART

In the process of producing steel via hot-rolling, the temperature of a steel slab is strictly required, so that the temperature of a steel plate needs to be accurately sensed in real time at each stage such as rough rolling, finish rolling, and laminar flow cooling. However, in the process such as dephosphorization and cooling in a steel rolling area and a laminar flow cooling area, nonuniform water films and vapor layers are formed on a surface of strip steel. These water films and vapor absorb and scatter infrared radiation, seriously disturbing the temperature sensing instrument that measures a temperature by infrared radiation, and thereby reducing the accuracy of temperature measurement. Moreover, factors, such as soot, plasma flash, and water mist, on the surface of a temperature measurement hole also easily affect an infrared thermometer placed near a conveying roller bed for rolled steel, further causing inaccuracy of temperature measurement for a steel surface.

Given the above problems, Chinese Patent Application No. 201810062303.4 provides a device and method for measuring a temperature by dual-wavelength radiation, the device includes an optical lens, a semi-transparent and semi-reflective beam splitter, and a system for data acquisition and analysis, and error evaluation, and the temperature measurement method includes relaxation approximation, monochromatic probabilistic approximation, and averaging, so as to correct and obtain a measured value of a surface temperature. Chinese Patent Application No. 200510011751.4 provides a dual-wavelength photoelectric thermometer based on black-body radiation, achieving immersion temperature measurement for molten steel by using a quartz glass window, as a luminous body, in thermal equilibrium with the molten steel, and achieving transmission, acquisition, and conversion of two ways of optical signals by a lens, a dichroic beam-splitting filter, a narrow-band filter, and an optoelectronic conversion apparatus. The above patent applications and related patents thereof all relate to the design of a light path of a thermometer, and a temperature measurement principle and method, to overcome undesirable disturbances such as water mist during steel production, and ensure the temperature measurement accuracy of the infrared thermometer.

Although the above prior art solves, to a certain extent, a temperature-measurement problem in a high-temperature environment, and makes preliminary exploration to deal with disturbing factors such as water vapor and an oxide layer, the prior art still has some defects, particularly in an industrial site environment where factors such as a water film, soot, vapor, etc. significantly disturb the accuracy and stability of measurement. For example, during temperature monitoring for a hot-rolling production line, a water film absorbing infrared signals may cause the temperature to be underestimated by up to 50° C., soot causes signal fluctuation beyond ±30° C., and a vapor layer causes a temperature measurement deviation of 20-30° C., and even data loss. These disturbances seriously affect process control and optimization, showing that the existing temperature measurement technique still needs to be improved for its reliability in complex industrial environments. The prior art, mainly relying on complex algorithms to perform disturbance correction, has difficulty in accurately determining specific causes of abnormal fluctuations of temperature measurement data, thereby being unable to satisfy the high-accuracy and highly real-time requirement for temperature measurement in modern industrial production. Therefore, a new technical solution is needed to implement high-accuracy, real-time, and reliable temperature measurement.

SUMMARY OF THE INVENTION

Given the above defects in the prior art, the present application is intended to solve the technical problem that it is difficult to achieve high-accuracy and highly real-time temperature measurement.

To achieve the above purpose, the present application provides a water-mist-penetrating temperature measurement system for steel hot rolling, comprising a water-mist-penetrating temperature measurement device, wherein the water-mist-penetrating temperature measurement device comprises a visible light guiding-tracking assembly, an optical focusing assembly, a dual-wavelength beam splitting assembly, a multi-source information processing assembly, and a display assembly, the visible light guiding-tracking assembly is configured to be able to determine a measurement view field of an object to be measured by guiding a visible light, and to achieve real-time tracking and monitoring of the object to be measured, the optical focusing assembly is configured to be able to focus the radiation beam emitted from the object to be measured and guide it to the dual-wavelength beam splitting assembly, the dual-wavelength beam splitting assembly is configured to be able to split the transmitted radiation beam into two radiation signals of different wavelengths and convert each radiation signal into a corresponding electrical signal, and the multi-source information processing assembly is configured to be able to fuse electrical signals with image signal received by the visible light guiding-tracking assembly through multi-source information integration, then send a processed image information and temperature information to the display assembly.

Furthermore, the system further comprises a high-pressure water jet cutting device, wherein the high-pressure water jet cutting device is configured to be able to accurately cut and uniformly thinning process on cooling water sprayed from a nozzle directly above a rolled steel on a conveying roller bed of a steel hot-rolling production line, and the rolled steel serves as the object to be measured.

Furthermore, the optical focusing assembly is a dual-curved-mirror assembly.

Furthermore, the optical focusing assembly is a Cassegrain curved mirror assembly.

Furthermore, the optical focusing assembly comprises a first curved mirror and a second curved mirror spaced apart along a central optical axis, the second curved mirror comprises a concave reflective surface and a central aperture formed on the concave reflective surface, the first curved mirror comprises a convex reflective surface arranged opposite to the concave reflective surface, and the optical focusing assembly is configured to be able to direct the radiant beam emitted from the object to be measured through an annular area surrounding the first curved mirror onto the second curved mirror, then guide the radiant beam sequentially via the concave reflective surface, the convex reflective surface, and the central aperture to the dual-wavelength spectral splitting assembly.

Furthermore, the dual-wavelength beam splitting assembly comprises a semi-transparent and semi-reflective beam-splitting mirror, a first radiation detector, a second radiation detector, a first monochromatic filter, and a second monochromatic filter, and the dual-wavelength beam splitting assembly is configured to be able to split the radiation beam into a transmitted beam and a reflected beam through the semi-transparent and semi-reflective beam-splitting mirror, direct the reflected beam through the first monochromatic filter to the first radiation detector for conversion into a first electrical signal, and direct the transmitted beam through the second monochromatic filter to the second radiation detector for conversion into a second electrical signal.

Furthermore, the first monochromatic filter and the second monochromatic filter have different center wavelengths.

Furthermore, curvatures of the first curved mirror and the second curved mirror are configured to be able to focus the radiation beam emitted from the object to be measured, such that the radiation beam can be focused onto the first radiation detector and the second radiation detector, respectively.

Furthermore, the dual-wavelength beam splitting assembly is integrated in a cubic structure; and the semi-transparent and semi-reflective beam-splitting mirror is mounted on a diagonal plane of a cube, and the first monochromatic filter and the first radiation detector corresponding to the first monochromatic filter, and the second monochromatic filter and the second radiation detector corresponding to the second monochromatic filter are located on two adjacent surfaces of the cube, respectively.

Furthermore, the multi-source information processing assembly comprises a processor, the first radiation detector is electrically connected to the processor, and the second radiation detector is electrically connected to the processor.

Furthermore, the display assembly comprises an onboard display, and the processor is electrically connected to the onboard display.

Furthermore, the visible light guiding-tracking assembly comprises a camera and a visible light source, the camera is configured to be able to achieve real-time tracking and monitoring of the object to be measured, and the visible light source is configured to be able to determine the measurement view field of the object to be measured by guiding the visible light.

Furthermore, the camera is electrically connected to the processor.

Furthermore, the water-mist-penetrating temperature measurement device further comprises a housing, the visible light guiding-tracking assembly, the optical focusing assembly, the dual-wavelength beam splitting assembly, the multi-source information processing assembly, and the display assembly are arranged within the housing, and the housing is provided with an optical aperture configured to be able to permit a transmission of the radiation beam emitted by the object to be measured.

Furthermore, a water-cooled jacket is provided outside the housing.

Furthermore, the system further comprises a device deployment support configured to be able to mount and position the water-mist-penetrating temperature measurement device and the high-pressure water jet cutting device.

The present application further provides a temperature measurement method using the water-mist-penetrating temperature measurement system for steel hot rolling, the system comprising:

a water-mist-penetrating temperature measurement device, wherein the water-mist-penetrating temperature measurement device comprises a visible light guiding-tracking assembly, an optical focusing assembly, a dual-wavelength beam splitting assembly, a multi-source information processing assembly, and a display assembly, the visible light guiding-tracking assembly is configured to be able to determine a measurement view field of an object to be measured by guiding a visible light, and to achieve real-time tracking and monitoring of the object to be measured, the optical focusing assembly is configured to be able to focus the radiation beam emitted from the object to be measured and guide it to the dual-wavelength beam splitting assembly, the dual-wavelength beam splitting assembly is configured to be able to split the transmitted radiation beam into two radiation signals of different wavelengths and convert each radiation signal into a corresponding electrical signal, and the multi-source information processing assembly is configured to be able to fuse electrical signals with image signal received by the visible light guiding-tracking assembly through multi-source information integration, then send a processed image information and temperature information to the display assembly; and high-pressure water jet cutting device, wherein the high-pressure water jet cutting device is configured to be able to accurately cut and uniformly thinning process on cooling water sprayed from a nozzle directly above a rolled steel on a conveying roller bed of a steel hot-rolling production line, and the rolled steel serves as the object to be measured;

the method comprising the steps of:

step 1. obtaining a dual-wavelength radiation signal and a visible light image signal of the object to be measured;

step 2. processing the obtained dual-wavelength radiation signal and a visible light image signal; and step 3. detecting and processing an abnormally fluctuated temperature data.

Furthermore, the step 1 comprises:

after the high-pressure water jet cutting device performs cutting and thinning processing on steam and a water layer, splitting the radiation beam from the object to be measured into a transmitted beam and a reflected beam via the dual-wavelength beam splitting assembly, wherein the transmitted beam is received by the first radiation detector through the first monochromatic filter, the reflected beam is received by the second radiation detector through the second monochromatic filter, and two ways of electrical signals are obtained through photoelectric converters, and acquiring the image of the object to be measured by a mounted visible light camera sized to be placed in front of surface of the optical focusing assembly without hindering the optical focusing assembly from receiving radiation beam from the object to be measured.

Furthermore, the step 2 comprises:

performing ratio processing on the dual-wavelength radiation signal according to a thermal radiation formula and obtaining a temperature data; then constructing a set of images of a surface of the object to be measured containing iron oxide scales, cracks, impurities, water vapor, and water mist, training an anomaly detection model, deploying the anomaly detection model in the processor, and performing analysis and anomaly detection on the obtained visible light image signal to determine whether an abnormal point or a disturbance is present on the object to be measured, and to provide a corresponding position and confidence.

Furthermore, the step 3 comprises:

when the temperature data is abnormally fluctuated, discarding abnormal temperature data if an abnormal point or a disturbance is present after image detection, or accepting data, and involving it into subsequent model calculation with the believing that the temperature data can reflect the real condition of the temperature of the object to be measured if there is no abnormal point or disturbance.

To achieve the above purpose, in a first aspect, the present application provides a water-mist-penetrating temperature measurement system for steel hot rolling, including a water-mist-penetrating temperature measurement device and a deployment support device, wherein the water-mist-penetrating temperature measurement device includes a visible light guiding-tracking assembly, an optical focusing assembly, a dual-wavelength beam splitting assembly, a multi-source information processing assembly, and a display assembly.

In the present application, the optical focusing assembly and dual-wavelength beam splitting assembly are introduced, a dual-curved-mirror refractive assembly causes a beam to quickly converge, and the dual-wavelength beam splitting assembly splits an original beam into two beams, then a dual-wavelength radiation measurement means is used, and disturbances such as water mist and soot are excluded by a ratio algorithm, thereby increasing the accuracy of measurement. Such an inventive step can overcome the sensitivity of a single-wavelength temperature measurement system to environmental changes, ensuring accurate temperature measurement in complex environments. Moreover, a beam focusing path is shortened to reduce a device volume, making the entire device more compact and portable. Such a design not only improves the applicability of the device, but also optimizes spatial occupation of the device, thereby enhancing the mobility of the system.

In the present application, an accurate visible light guiding-tracking assembly is added, and a camera shooting function is combined to achieve real-time tracking and monitoring of a target. In addition, the high-pressure water jet cutting device is used to form a uniform water film on a hot-rolled surface, thus providing better conditions for laser irradiation and camera shooting. Such a design not only helps an operator to accurately determine the position of a measurement point, but also helps to determine in real time during measurement whether an abnormal condition is present for the target, thus significantly increasing the reliability and accuracy of measurement.

In an embodiment of the present application, the visible light guiding-tracking assembly includes a camera and a visible light source; and the optical focusing assembly includes a front curved mirror and a rear curved mirror.

In the present application, the visible light guiding-tracking assembly is added to enable an operator to easily confirm a measurement target and to determine in real time whether the temperature of a measurement point is abnormal, thereby increasing the ease of use and reliability of the system. The dual-curved-mirror refractive assembly is used to reduce a device volume, so that the device is more portable and can be more applicable to narrow workspaces.

In another embodiment of the present application, the dual-wavelength beam splitting assembly includes a semi-transparent and semi-reflective beam-splitting mirror, a first monochromatic filter and a first radiation detector that are designed on a reflection light path, and a second monochromatic filter and a second radiation detector on a transmission light path.

The dual-wavelength measurement technique in the present application can counteract disturbances caused by environmental changes (such as water mist, soot, etc.), thereby increasing the stability and accuracy of temperature measurement.

In another embodiment of the present application, the multi-source information processing assembly connects an electrical signal and an image signal to a processor via a transmission line and transmits processed image information and temperature information to an onboard display of the display assembly.

In another embodiment of the present application, the deployment support device includes a high-pressure water jet cutting device and a device deployment support; the high-pressure water jet cutting device is used for accurate cutting and uniform thinning processing on cooling water sprayed from a nozzle directly above steel; and the device deployment support is used for securely mounting and accurately positioning the water-mist-penetrating temperature measurement device and the high-pressure water jet cutting device.

In another embodiment of the present application, the optical focusing assembly is a dual-curved-mirror assembly including two curved mirrors spaced apart from each other along an optical axis, which are a front curved mirror and a rear curved mirror; the front curved mirror reflects incident radiation back to the temperature measurement device via a central aperture of the rear curved mirror;

the dual-wavelength beam splitting assembly is integrated in a cubic structure; and the semi-transparent and semi-reflective beam-splitting mirror is mounted on a diagonal plane of a cube, and a first monochromatic filter and a first radiation detector corresponding to the first monochromatic filter, and a second monochromatic filter and a second radiation detector corresponding to the second monochromatic filter are located on two adjacent surfaces of the cube, respectively. A group of curved mirrors in the optical focusing assembly are responsible for focusing and refracting optical radiation, and refracted optical radiation is split into two beams by the semi-transparent and semi-reflective beam-splitting mirror. These two beams pass through respective monochromatic filters and project onto respective radiation detectors, thereby accurately measuring optical radiation of different wavelengths. Detected radiation signals are processed via a ratio algorithm, and the disturbances can be counteracted by means of an attenuation difference for optical radiation of different wavelengths in disturbing environments such as water mist and soot, thereby increasing the accuracy of measurement.

The system herein, combining temperature measurement and real-time image monitoring, can effectively identify an anomaly on a surface of strip steel, such as iron oxide scales or a water film, to avoid a temperature fluctuation caused by a device failure or a measurement error, thereby improving the stability and reliability of the entire system.

In conclusion, the present application solves the problems for temperature measurement in the prior art that are insufficient accuracy, excessive device volume, complicated operations, etc. by the inventive dual-wavelength temperature measurement technique, accurate optical focusing design, and perfect multi-source information processing assembly, greatly increasing the accuracy, stability, and operability of temperature measurement for a hot rolling production line, and resulting in a wide application prospect.

In another aspect, the present application provides a method using the water-mist-penetrating temperature measurement system for steel hot rolling as described in the first aspect, the method including:

(1) obtaining a dual-wavelength radiation temperature measurement signal and a visible light camera image;
(2) processing a temperature measurement signal for strip steel to be measured and an image of an area to be measured; and
(3) detecting and processing an abnormally fluctuated temperature data.

Regarding the temperature measurement method having the information fusion of dual-wavelength infrared radiation with a visible light image, the present application, fully combining special process characteristics of a laminar flow cooling process for hot rolling and considering the disturbances, such as iron oxide scales and water layers, that may be present on a surface of strip steel, provides a multi-source information fusion method that is based on the dual-wavelength infrared radiation signal and the visible light image information, which method is used for measuring the temperature of strip steel in a laminar flow cooling area. The method can effectively deal with temperature measurement fluctuations caused by environmental disturbances (such as water vapor, steam, bubbles, etc.) and foreign matters (such as iron oxide scales) on the surface of the strip steel, ensuring that the temperature of the strip steel can be measured accurately in complex environments. By the multi-source information fusion technique, the impacts of these disturbing factors on a temperature measurement result can be eliminated, increasing the accuracy and reliability of measurement.

In another embodiment of the present application, step (1) further includes: after a high-pressure water jet cutting device performs cutting and thinning processing on steam and a water layer, splitting a radiation beam from strip steel into a transmitted beam and a reflected beam via a curved mirror and a semi-transparent and semi-reflective beam-splitting mirror, wherein the transmitted beam is received by the first radiation detector via the first monochromatic filter, the reflected beam is received by the second radiation detector after passing through the second monochromatic filter, and two ways of radiation signals are obtained via a photoelectric converter; and acquiring the image of the area of the strip steel by a mounted visible light camera sized to be placed on a front surface of a thermometer without hindering the thermometer from receiving radiation from an object to be measured.

In another embodiment of the present application, step (2) further includes: performing ratio processing on a dual-wavelength infrared radiation signal according to a thermal radiation formula and obtaining a temperature to be measured; then constructing a set of images of a surface of the strip steel containing iron oxide scales, cracks, impurities, water vapor, and water mist, training an anomaly detection model, deploying the detection model in a processor, and performing analysis and anomaly detection on the image obtained by the mounted visible light camera to determine whether an abnormal point or a disturbance is present in the area to be measured, and to provide a corresponding position and confidence.

In another embodiment of the present application, step (3) further includes: when the temperature of a strip steel to be measured is abnormally fluctuated, discarding abnormal temperature data if an abnormal point or a disturbance is present after image detection, or accepting data, and involving it into subsequent model calculation with the believing that the temperature reflects the real condition of the temperature of the strip steel if there is no abnormal point or disturbance.

The method provided by the present application can eliminate the impacts of disturbing factors such as iron oxide scales and a water film on the surface of the strip steel by the ratio processing on the dual-wavelength infrared radiation signal and visible light image analysis, thereby greatly increasing the accuracy of temperature measurement. It can effectively filter out error data and invalid data by real-time determining and data processing for an abnormal fluctuation, avoiding the impact of an abnormal temperature fluctuation on a subsequent calculation model to increase the reliability and consistency of temperature data. The method, fully considering complex environmental factors of a laminar flow cooling process for hot rolling and combining the fusion technique involving dual wavelengths and image information, effectively deals with the disturbances caused by the factors such as water vapor, steam, bubbles, and iron oxide scales, and thus can achieve stable and accurate temperature measurement under complex working conditions. The real-time image analysis assembly not only can capture the anomaly on the surface of strip steel, but also can feed back the reliability of measurement data in real time, so that an operator can quickly determine whether re-measurement or device adjustment is required. By the data processing and anomaly detection that are automatic, manual intervention is reduced to increase the degree of automation of the temperature measurement system, making a more efficient and accurate temperature measurement process.

By the multi-source information fusion (dual-wavelength infrared radiation and a visible light image) in combination with the process characteristics of hot rolling production, the present application solves the problems of measurement errors and fluctuations during temperature measurement in the prior art that are caused by environmental disturbances and condition changes on the surface of the strip steel, thus increasing the accuracy, and reliability of temperature measurement, and the adaptability of the system, and resulting in a significant technical advantage and an application prospect.

Technical Effects

The present application provides the water-mist-penetrating temperature measurement device and the temperature measurement method having multi-source information fusion involving dual-wavelength infrared radiation and a visible light image, and the device and method have significant technical advantages and broad industrialized application prospects. The present application not only solves multiple problems in the existing temperature measurement technique, but also achieves innovation in aspects of the accuracy, real-time performance, anti-disturbance capability, etc. for temperature measurement, and therefore has great commercialization potential in industry.

1. Technical Advantages

High Accuracy and Reliability

The present application eliminates the disturbances caused by factors such as nonuniform emissivity of a surface of strip steel, water vapor, and iron oxide scales by dual-wavelength ratio processing on infrared radiation signals by a ratio method for dual-wavelength infrared radiation, thereby ensuring high accuracy and high reliability of a temperature measurement result. The dual-wavelength infrared technique can maintain higher measurement stability in complex environments than the conventional single-wavelength infrared temperature measurement technique, satisfying the temperature measurement accuracy strictly required in modern industrial production.

Multi-Source Information Fusion

By the fusion processing that combines visible light image information and an infrared radiation signal, the present application can consider both the abnormal conditions (such as iron oxide scales and water vapor) of a strip steel surface and the environmental disturbance in a measurement light path. The system herein can analyze image information in real time to automatically determine a disturbing factor and to perform data rejection in the case of a relatively large fluctuation in temperature measurement, greatly increasing the reliability and accuracy of measurement.

2. Performance Indicators

Measurement Range

The dual-wavelength infrared temperature measurement device of the present application, which is applicable to high-temperature environments, has the measurement range that may cover temperatures from 500° C. to 1200° C. or even higher, and is widely applicable in high-temperature industrial fields such as steel smelting and aluminum production. Its high-temperature measurement capability is particularly suitable to the demands in fields such as steel production lines including hot rolling.

Anti-Disturbance Capability

By multi-wavelength signal processing and visible light image analysis, external disturbances such as water vapor and iron oxide scales can be removed to maintain measurement accuracy. That is particularly important for temperature measurement in complex environments in the hot-rolling production line for steel. The present application can provide stable measurement results under different conditions including steam or other disturbances.

Response Speed

The temperature measurement system of the present application has a relatively high response speed, which can complete temperature measurement in milliseconds, and is applicable to a production environment where strip steel moves at a high speed. The real-time anomaly detection and data rejection during measurement help to ensure stability and accuracy during production.

3. Production Implementation and Industrialized Application Prospect

Wide Industrial Application

The technical solution of the present application not only is applicable to hot-rolling production lines, but also can be widely applied in industrial fields such as steel, and aluminum producing that require high-temperature measurement. The technical solution has relatively good universality and can be customized for different industries, resulting in broad market applications.

Solution to Existing Technical Bottleneck

The existing single-wavelength infrared temperature measurement technique has the problems of relatively large measurement fluctuations and errors in complex environments, such as disturbances of high temperatures, steam, bubbles, oxides, etc. By the fusion of dual-wavelength infrared radiation and visible light image information, the present application breaks these technical bottlenecks to enable more stable and reliable temperature measurement results, greatly improving the accuracy of temperature measurement and the credibility of data in industrial production, and thereby filling the gap in the prior art.

Reduction in Production Cost

The automated temperature control system of the present application can reduce a rework rate or rejection rate caused by inaccurate temperature measurement, thereby increasing production efficiency and reducing material waste. In long-term operation, a production process based on accurate temperature control can greatly reduce device loss to increase a device service life, and to reduce maintenance and failure downtime, further reducing a production cost.

4. Feasibility of Technology Commercialization

The technical solution of the present application has relatively good feasibility in commercialization, which is specifically embodied as follows.

Device Maturity

The temperature measurement device of the present application has a relatively high degree of technical maturity and stability, and is suitable for practical applications in industrial production lines. The high accuracy, real-time performance, and anti-disturbance capability of the temperature measurement device enable the device to be an ideal option for measuring and monitoring a temperature in modern industrial production lines.

Market Demand

The temperature measurement technique provided by the present application is in line with the demand trend in the market that industrial production increasingly requires accurate temperature control and quality monitoring, particularly in high-temperature manufacturing industries such as steel, and aluminum where accurate temperature control and process optimization hold the key to improve production efficiency and product quality. The present application can solve the sore point in the existing temperature measurement technique and has a broad market application prospect.

Technology Promotion and Application

The temperature measurement technique of the present application will be applied in a wider range with the accelerated development of automation and intelligent production, and can achieve more intelligent production management in combination with an industrial control system and a production management system, further promoting digital transformation in industry.

The technical solution of the present application not only has a significant technical advantage, but also has a wide industrialized application prospect. The technical solution solves problems in the existing temperature measurement technique by providing a high-accuracy, stable, and reliable temperature measurement technique, and has great commercialization potential in the market. The present application exhibits a relatively good industrialization prospect and a technical application value, either in the industries such as steel smelting, and aluminum production, or in aspects for realizing domestic replacement, and can promote technical upgrade, including intelligent development, of relevant industries.

The conception, specific structure, and generated technical effect of the present invention will be further described below with reference to the drawings, so as to fully understand the purpose, feature, and effect of the invention.

Figure 1:
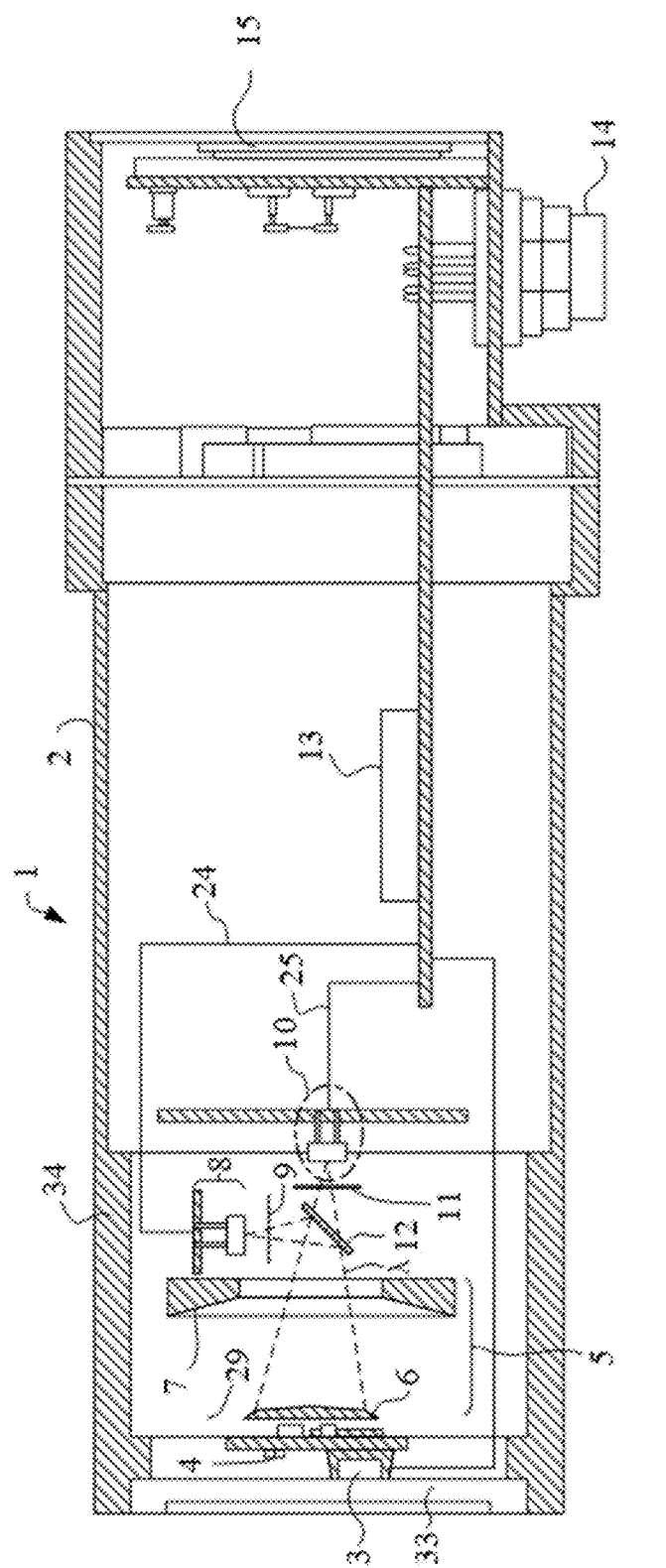
FIG. 1 is a schematic cross-sectional view of a water-mist-penetrating temperature measurement device for steel hot rolling according to an embodiment of the present application.

In which: 1—water-mist-penetrating temperature measurement device; 2—housing; 3—camera; 4—visible light source; 5—optical focusing assembly; 6—front curved mirror; 7—rear curved mirror; 8—first radiation detector; 9—first monochromatic filter; 10—second radiation detector; 11—second monochromatic filter; 12—semi-transparent and semi-reflective beam-splitting mirror; 13—processor; 14—support; 15—onboard display; 16—high-pressure water jet cutting device; 17—rolled steel; 18—conveying roller bed; 19—device deployment support; 20—measurement view field; 21—radiation beam; 22—transmitted beam; 23—reflected beam; 24—first electrical signal; 25—second electrical signal; 26—convex reflective surface; 27—concave reflective surface; 28—central aperture; 29—annular area; 30—cube; 31—diagonal plane; 32—adjacent surfaces; 33—optical aperture; 34—water-cooled jacket.

DETAILED DESCRIPTION OF THE PREFERRED EMBODIMENTS

A plurality of preferred embodiments of the present invention are described below with reference to the drawings of the description, to clarify the technical content of the invention. The present invention may be embodied in many different forms of embodiments, and the scope of protection of the present invention is not limited to the embodiments mentioned herein.

In the drawings, components with the same structure are denoted by the same reference number, and various assemblies with similar structures or functions are denoted by similar reference numbers. The size and thickness of each assembly shown in the drawings are illustrated arbitrarily, and the present invention does not limit the size and thickness of each assembly. The thickness of the component is enlarged appropriately at some places in the drawings for clear illustration.

As shown in FIGS. 1-5, the present embodiment provides a water-mist-penetrating temperature measurement system for steel hot rolling, including a water-mist-penetrating temperature measurement device 1 and a high-pressure water jet cutting device 16. The water-mist-penetrating temperature measurement device 1 includes a visible light guiding-tracking assembly, an optical focusing assembly, a dual-wavelength beam splitting assembly, a multi-source information processing assembly, and a display assembly. The visible light guiding-tracking assembly is configured to be able to determine a measurement view field 20 of an object to be measured (e.g., a rolled steel 17) by guiding a visible light, and to achieve real-time tracking and monitoring of the object to be measured, the optical focusing assembly is configured to be able to focus the radiation beam 21 emitted from the object to be measured and guide it to the dual-wavelength beam splitting assembly, the dual-wavelength beam splitting assembly is configured to be able to split the transmitted radiation beam 21 into two radiation signals of different wavelengths and convert each radiation signal into a corresponding electrical signal, and the multi-source information processing assembly is configured to be able to fuse electrical signals with image signal received by the visible light guiding-tracking assembly through multi-source information integration, then send a processed image information and temperature information to the display assembly. The high-pressure water jet cutting device 16 is configured to be able to accurately cut and uniformly thinning process on cooling water sprayed from a nozzle directly above a rolled steel 17 on a conveying roller bed 18 of a steel hot-rolling production line, and the rolled steel 17 serves as the object to be measured.

In some embodiments, the optical focusing assembly is a dual-curved-mirror assembly.

In some embodiments, the optical focusing assembly is a Cassegrain curved mirror assembly.

The optical focusing assembly may include a first curved mirror (i.e., a front curved mirror 6) and a second curved mirror (i.e., a rear curved mirror 7) spaced apart along a central optical axis L, the second curved mirror includes a concave reflective surface 27 and a central aperture 28 formed on the concave reflective surface 27, the first curved mirror includes a convex reflective surface 26 arranged opposite to the concave reflective surface 27, and the optical focusing assembly is configured to be able to direct the radiant beam 21 emitted from the object to be measured through an annular area 29 surrounding the first curved mirror onto the second curved mirror, then guide the radiant beam 21 sequentially via the concave reflective surface 27, the convex reflective surface 26, and the central aperture 28 to the dual-wavelength spectral splitting assembly.

The dual-wavelength beam splitting assembly may include a semi-transparent and semi-reflective beam-splitting mirror 12, a first radiation detector 8, a second radiation detector 10, a first monochromatic filter 9, and a second monochromatic filter 11, and the dual-wavelength beam splitting assembly is configured to be able to split the radiation beam 21 into a transmitted beam 22 and a reflected beam 23 through the semi-transparent and semi-reflective beam-splitting mirror 12, direct the reflected beam 23 through the first monochromatic filter 9 to the first radiation detector 8 for conversion into a first electrical signal 24, and direct the transmitted beam 22 through the second monochromatic filter 11 to the second radiation detector 10 for conversion into a second electrical signal 25.

The first monochromatic filter 9 and the second monochromatic filter 11 have different center wavelengths.

Curvatures of the first curved mirror and the second curved mirror are configured to be able to focus the radiation beam 21 emitted from the object to be measured, such that the radiation beam 21 can be focused onto the first radiation detector 8 and the second radiation detector 10, respectively.

In some embodiments, the dual-wavelength beam splitting assembly is integrated in a cubic structure; and the semi-transparent and semi-reflective beam-splitting mirror 12 is mounted on a diagonal plane 31 of a cube 30, and the first monochromatic filter 9 and the first radiation detector 8 corresponding to the first monochromatic filter 9, and the second monochromatic filter 11 and the second radiation detector 10 corresponding to the second monochromatic filter 11 are located on two adjacent surfaces 32 of the cube 30, respectively.

The multi-source information processing assembly may include a processor 13, the first radiation detector 8 is electrically connected to the processor 13, and the second radiation detector 10 is electrically connected to the processor 13.

The display assembly may include an onboard display 15, and the processor 13 is electrically connected to the onboard display 15.

The visible light guiding-tracking assembly may include a camera 3 and a visible light source 4, the camera 3 is configured to be able to achieve real-time tracking and monitoring of the object to be measured, and the visible light source 4 is configured to be able to determine the measurement view field 20 of the object to be measured by guiding the visible light. The camera 3 is electrically connected to the processor 13.

The water-mist-penetrating temperature measurement device further includes a housing 2, the visible light guiding-tracking assembly, the optical focusing assembly, the dual-wavelength beam splitting assembly, the multi-source information processing assembly, and the display assembly are arranged within the housing 2, and the housing 2 is provided with an optical aperture 33 configured to be able to permit a transmission of the radiation beam 21 emitted by the object to be measured. A water-cooled jacket 34 may be provided outside the housing 2.

In some embodiments, the system further includes a device deployment support 19 configured to be able to mount and position the water-mist-penetrating temperature measurement device 1 and the high-pressure water jet cutting device 16.

Figure 2:
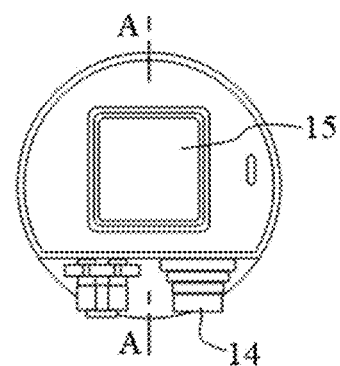
FIG. 2 is an end view of a rear portion of a water-mist-penetrating temperature measurement device for steel hot rolling according to an embodiment of the present application.

Referring to FIGS. 1 and 2, they are schematic diagrams of a water-mist-penetrating temperature measurement device for steel hot rolling. FIG. 1 is a cross-section along a line A-A shown in FIG. 2, which is an end view of a rear portion of the water-mist-penetrating temperature measurement device 1 taken from the position of an observer. Assemblies of the temperature measurement device are contained in a housing 2, and the housing 2 may be provided with a water-cooled jacket 34 to insulate the water-mist-penetrating temperature measurement device 1 from a high temperature environment. In an example of temperature monitoring for hot-rolling production lines, the housing 2 is mounted to a device deployment support 19 or a wall or other surfaces via a support 14, and power is received from a power supply or a generator and is used for static monitoring at a desired position. However, in other examples, the temperature measurement device may also be implemented as a handheld or portable device provided with an onboard power supply.

As described in the preceding embodiment, the first radiation detectors 8 and the second radiation detector 10 are configured to receive radiation from rolled steel 17 via an optical focusing assembly 5. Cones denoted by λ as indicated by a dashed line in FIG. 1 illustrates radiation paths through the optical focusing assembly 5 to the first radiation detectors 8 and the second radiation detector 10, respectively.

Figure 3:
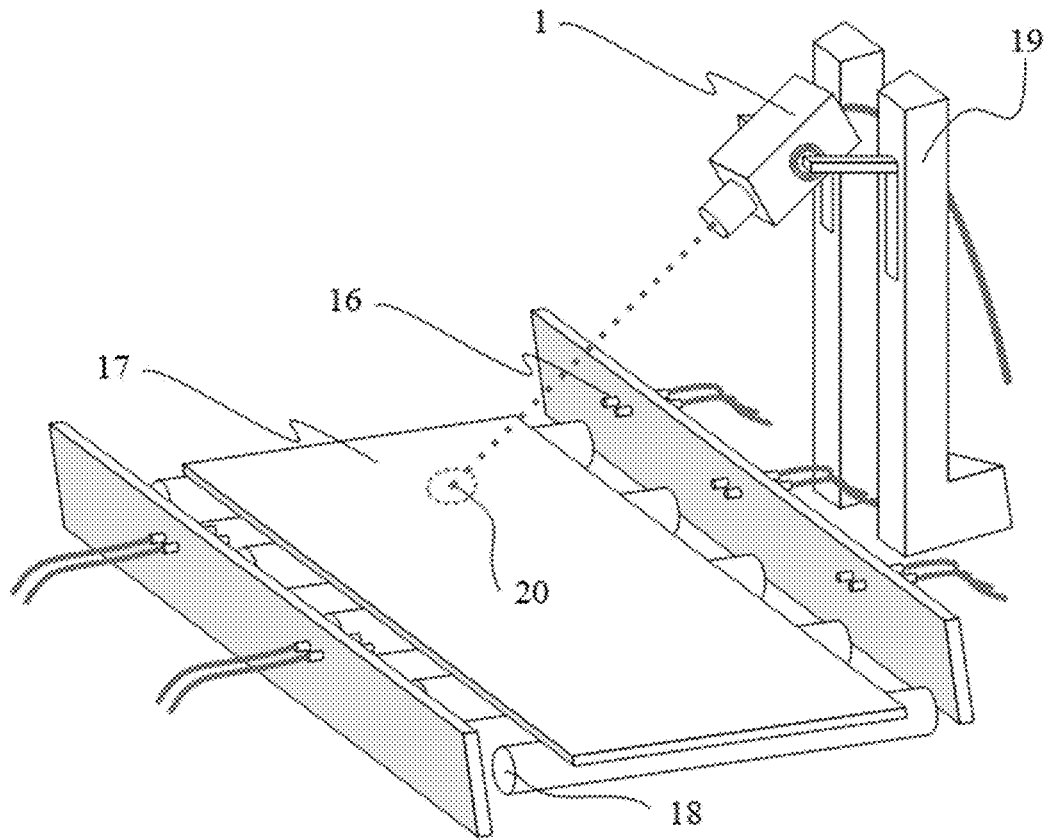
FIG. 3 is a schematic diagram of deployment of a water-mist-penetrating temperature measurement system for steel hot rolling according to an embodiment of the present application.

As shown in FIG. 3, a high-pressure water jet cutting device 16 is used for cutting and thinning processing on cooling water sprayed from a nozzle directly above the rolled steel 17 at a hot-rolling laminar flow cooling section, and the device deployment support 19 is used for deploying and clamping the water-mist-penetrating temperature measurement device and the high-pressure water jet cutting device of the present embodiment. A measurement view field 20 is an area to be measured of a surface of a steel plate and is determined by a range of a field angle of an optical focusing assembly 5.

Figure 4:
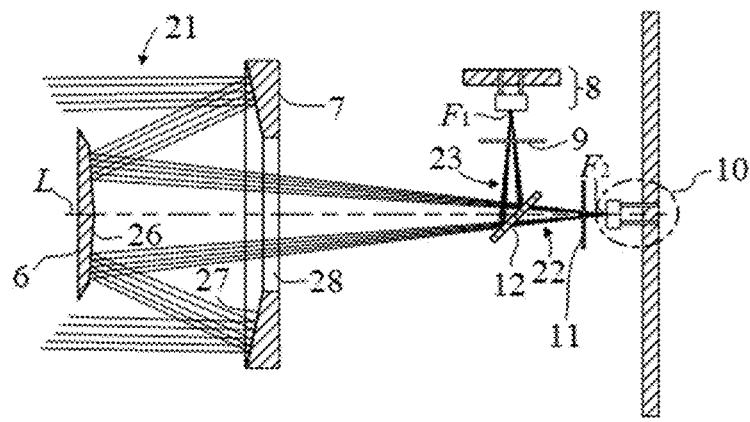
FIG. 4 is a schematic diagram of a dual-wavelength light path in an optical focusing assembly and a radiation detector according to an embodiment of the present application.
Figure 5:
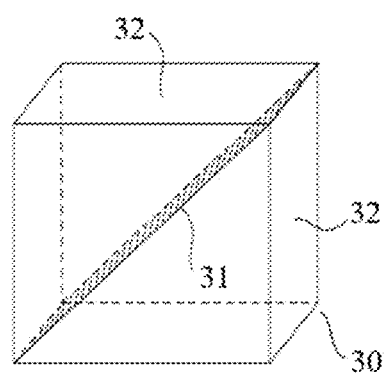
FIG. 5 is a schematic diagram of a cubic structure for a dual-wavelength beam splitting assembly according to an embodiment of the present application.

As shown in FIG. 4, the optical focusing assembly 5 is implemented as a dual-curved-mirror assembly, particularly a Cassegrain curved mirror assembly. The Cassegrain curved mirror assembly includes a rear curved mirror 7 and a front curved mirror 6, both symmetrically arranged on an optical axis L. The rear curved mirror 7 has a central aperture 28 to permit transmission of light to the photosensitive device. The rear curved mirror 7 is a concave parabolic reflector configured to converge light rays parallel to the optical axis L onto a single focal point, while the front curved mirror 6 is a convex hyperbolic reflector that directs reflected light through the central aperture 28 of the rear curved mirror 7 toward the dual-wavelength beam splitting assembly. The key components of the optical focusing assembly 5 are shown in FIG. 1.

The optical focusing assembly 5 includes the front curved mirror 6 and the rear curved mirror 7 spaced from each other along the optical axis L. The front curved mirror 6 is referred to as a first curved mirror. The rear curved mirror 7 is referred to as a second curved mirror, which receives an incident radiation beam 21 via an annular area 29 around the front curved mirror 6. The rear curved mirror 7 includes an annular curved portion, which reflects incident radiation onto a rear surface of the front curved mirror 6 that is in the shape of a dome. Therefore, the front curved mirror 6 reflects the incident radiation back to the temperature measurement device via a central aperture 28 of the rear curved mirror 7. The curvatures of the two curved mirrors are configured to achieve the focusing of the incident radiation as shown in FIG. 4, such that the radiation is focused to a focal point $F_1$ on the first radiation detectors 8 and a focal point $F_2$ on the second radiation detector 10 in a manner equivalent to a result of a lens assembly.

Figure 6:
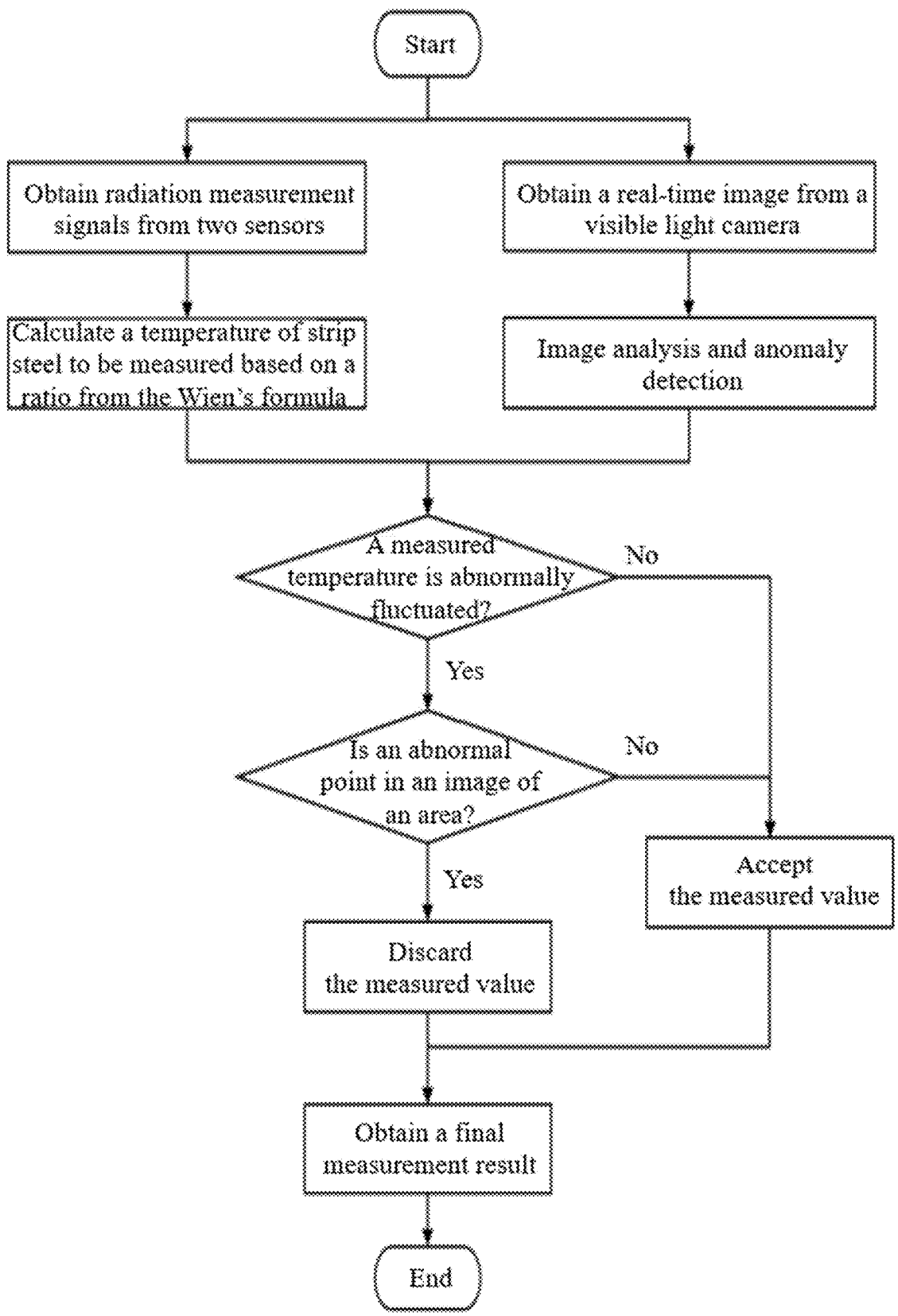
FIG. 6 is a flowchart of a temperature measurement method according to an embodiment of the present application.

Referring to FIG. 6, it is a flowchart of a temperature measurement method according to an embodiment of the present application, the method including the following specific steps:
step 1: obtaining a dual-wavelength radiation temperature measurement signal and a visible light camera image;
step 2: calculating a temperature of a temperature measurement device for strip steel to be measured and processing an image of an area to be measured; and
step 3: detecting and processing an abnormally fluctuated temperature.

Moreover, step 1 further includes:
splitting a radiation beam from strip steel in a laminar flow cooling area into a transmitted beam 22 and a reflected beam 23 via a dual-curved-mirror assembly and a semi-transparent and semi-reflective beam-splitting mirror 12. The temperature of strip steel during steel hot-rolling is relatively high, and a temperature measurement range needs to cover 500° C. to 1200° C., and thus, based on a spectral curve of blackbody radiation, the center wavelength of the first monochromatic filter 9 is selected to be $\lambda_1=0.8$ μm, and the center wavelength of the second monochromatic filter 11 is selected to be $\lambda_2=0.9$ μm. The transmitted beam 22 and the reflected beam 23 are received by the first radiation detector 8 and the second radiation detector 10 via the first monochromatic filter 9 and the second monochromatic filter 11, respectively. The image of the area of the strip steel is acquired by a mounted visible light camera 3 sized to be placed on a front surface of a thermometer without hindering the thermometer from receiving radiation from an object to be measured.

Moreover, step 2 further includes:

based on the blackbody radiation law and Wien's formula in thermodynamics, a ratio R(T) of optical radiation measurement signals generated by the first radiation detector 8 and the second radiation detector 10 is as follows:

$$R(T) = \frac{M(\lambda_1, T)d\lambda_1}{M(\lambda_2, T)d\lambda_2} = \frac{\varepsilon(\lambda_1, T)d\lambda_1}{\varepsilon(\lambda_2, T)d\lambda_2}\left(\frac{\lambda_2}{\lambda_1}\right)^5 e^{\left[\frac{c_2}{T}\left(\frac{1}{\lambda_2}-\frac{1}{\lambda_1}\right)\right]},$$

where $C_2$ is a second radiation constant, T is a temperature of the object to be measured, $M(\lambda_1,T)$ and $M(\lambda_2, T)$ are the radiances of the object to be measured at two wavelengths, $\varepsilon(\lambda_1,T)$ and $\varepsilon(\lambda_2,T)$ are the emissivities of the object to be measured at two wavelengths, and $d\lambda_1$ and $d\lambda_2$ are the bandwidths at two wavelengths, respectively. Assuming that bandwidths of both wavelengths are equal and believing that the object to be measured has approximately the same emissivity at both similar wavelengths, a measured value of the temperature of strip steel is calculated as follows:

$$T = \frac{C_2\left(\frac{1}{\lambda_2}-\frac{1}{\lambda_1}\right)}{\ln(R(T))-5\ln\left(\frac{\lambda_2}{\lambda_1}\right)}.$$

Anomaly determining is performed on the area to be measured of the strip steel, an anomaly detection method based on a deep convolutional network and an attention mechanism is used to construct a set of images of the surface of the strip steel containing iron oxide scales, cracks, impurities, water vapor, water mist, etc., an anomaly detection model is trained, detection is performed, and then the model is deployed in a processor.

Moreover, step 3 further includes:

when the temperature of a strip steel to be measured is abnormally fluctuated, discarding abnormal temperature data if an abnormal point or a disturbance as described above is present after image detection, or accepting data, and involving it into subsequent model calculation with the believing that the temperature can reflect the real condition of the temperature of the strip steel if there is no abnormal point or disturbance as described above.

Preferred specific embodiments of the present invention are described in detail above. It should be understood that those of ordinary skill in the art can make various modifications and variations according to the conception of the present invention without the exercise of inventive effort. Therefore, any technical solution that can be obtained by a person skilled in the art by logical analysis, reasoning, or limited experimentation on the basis of the prior art according to the conception of the present invention should fall within the scope of protection determined by the claims.

The invention claimed is:

1. A water-mist-penetrating temperature measurement system for steel hot rolling, comprising a water-mist-penetrating temperature measurement device, and a high-pressure water jet cutting device; wherein the water-mist-penetrating temperature measurement device comprises a visible light guiding-tracking assembly, an optical focusing assembly; a dual-wavelength beam splitting assembly, a multi-source information processing assembly, and a display assembly; the visible light guiding-tracking assembly is configured to determine a measurement view field of an object to be measured by guiding a visible light, to achieve real-time tracking and monitoring of the object to be measured, and to receive a visible light image signal from the object to be measured; the optical focusing assembly is configured to focus an infrared radiation beam emitted from the object to be measured and guide it to the dual-wavelength beam splitting assembly; the dual-wavelength beam splitting assembly is configured to split the infrared radiation beam into two infrared radiation signals of different wavelengths and convert each infrared radiation signal into a corresponding electrical signal; the multi-source information processing assembly is configured to fuse electrical signals with the visible light image signal received by the visible light guiding-tracking assembly through multi-source information integration, then send a processed image information and temperature information to the display assembly; and the high-pressure water jet cutting device is configured to cut and thin cooling water sprayed from a nozzle directly above a rolled steel on a conveying roller bed of a steel hot-rolling production line, and the rolled steel serves as the object to be measured.

2. The water-mist-penetrating temperature measurement system for steel hot rolling according to claim 1, wherein the optical focusing assembly is a dual-curved-mirror assembly.

3. The water-mist-penetrating temperature measurement system for steel hot rolling according to claim 2, wherein the optical focusing assembly is a Cassegrain curved mirror assembly.

4. The water-mist-penetrating temperature measurement system for steel hot rolling according to claim 3, wherein the optical focusing assembly comprises a first curved mirror and a second curved mirror spaced apart along a central optical axis, the second curved mirror comprises a concave reflective surface and a central aperture formed on the concave reflective surface, the first curved mirror comprises a convex reflective surface arranged opposite to the concave reflective surface, and the optical focusing assembly is configured to direct the infrared radiation beam emitted from the object to be measured through an annular area surrounding the first curved mirror onto the second curved mirror, then guide the infrared radiation beam sequentially via the concave reflective surface, the convex reflective surface, and the central aperture to the dual-wavelength beam splitting assembly.

5. The water-mist-penetrating temperature measurement system for steel hot rolling according to claim 4, wherein the dual-wavelength beam splitting assembly comprises a semi-transparent and semi-reflective beam-splitting mirror, a first radiation detector, a second radiation detector, a first monochromatic filter, and a second monochromatic filter, and the dual-wavelength beam splitting assembly is configured to split the infrared radiation beam into a transmitted beam and a reflected beam through the semi-transparent and semi-reflective beam-splitting mirror, direct the reflected beam through the first monochromatic filter to the first radiation detector for conversion into a first electrical signal, and direct the transmitted beam through the second monochromatic filter to the second radiation detector for conversion into a second electrical signal.

6. The water-mist-penetrating temperature measurement system for steel hot rolling according to claim 5, wherein the first monochromatic filter and the second monochromatic filter have different center wavelengths.

7. The water-mist-penetrating temperature measurement system for steel hot rolling according to claim 5, wherein curvatures of the first curved mirror and the second curved mirror are configured to focus the infrared radiation beam emitted from the object to be measured, such that the infrared radiation beam can be focused onto the first radiation detector and the second radiation detector, respectively.

8. The water-mist-penetrating temperature measurement system for steel hot rolling according to claim 5, wherein the dual-wavelength beam splitting assembly is integrated in a cubic structure; and the semi-transparent and semi-reflective beam-splitting mirror is mounted on a diagonal plane of a cube, and the first monochromatic filter and the first radiation detector corresponding to the first monochromatic filter, and the second monochromatic filter and the second radiation detector corresponding to the second monochromatic filter are located on two adjacent surfaces of the cube, respectively.

9. The water-mist-penetrating temperature measurement system for steel hot rolling according to claim 5, wherein the multi-source information processing assembly comprises a processor, the first radiation detector is electrically connected to the processor, and the second radiation detector is electrically connected to the processor.

10. The water-mist-penetrating temperature measurement system for steel hot rolling according to claim 9, wherein the display assembly comprises a display, and the processor is electrically connected to the display.

11. The water-mist-penetrating temperature measurement system for steel hot rolling according to claim 9, wherein the visible light guiding-tracking assembly comprises a camera and a visible light source, the camera is configured to achieve real-time tracking and monitoring of the object to be measured, and to receive the visible light image signal from the object to be measured; and the visible light source is configured to determine the measurement view field of the object to be measured by guiding the visible light.

12. The water-mist-penetrating temperature measurement system for steel hot rolling according to claim 11, wherein the camera is electrically connected to the processor.

13. The water-mist-penetrating temperature measurement system for steel hot rolling according to claim 1, wherein the water-mist-penetrating temperature measurement device further comprises a housing, the visible light guiding-tracking assembly, the optical focusing assembly, the dual-wavelength beam splitting assembly, the multi-source information processing assembly, and the display assembly are arranged within the housing, and the housing is provided with an optical aperture configured to permit a transmission of the infrared radiation beam emitted by the object to be measured.

14. The water-mist-penetrating temperature measurement system for steel hot rolling according to claim 13, wherein a water-cooled jacket is provided outside the housing.

15. The water-mist-penetrating temperature measurement system for steel hot rolling according to claim 1, further comprising a device deployment support configured to mount and position the water-mist-penetrating temperature measurement device and the high-pressure water jet cutting device.

16. A temperature measurement method using a water-mist-penetrating temperature measurement system for steel hot rolling, the system comprising:
  a water-mist-penetrating temperature measurement device, wherein the water-mist-penetrating temperature measurement device comprises a visible light guiding-tracking assembly, an optical focusing assembly, a dual-wavelength beam splitting assembly, a multi-source information processing assembly, and a display assembly, the visible light guiding-tracking assembly is configured to determine a measurement view field of an object to be measured by guiding a visible light, and to achieve real-time tracking and monitoring of the object to be measured, and to receive a visible light image signal from the object to be measured; the optical focusing assembly is configured to focus an infrared radiation beam emitted from the object to be measured and guide it to the dual-wavelength beam splitting assembly; the dual-wavelength beam splitting assembly is configured to split the transmitted infrared radiation beam into two infrared radiation signals of different wavelengths and convert each infrared radiation signal into a corresponding electrical signal, and the multi-source information processing assembly is configured to fuse electrical signals with the visible light image signal received by the visible light guiding-tracking assembly through multi-source information integration, then send a processed image information and temperature information to the display assembly; and
  a high-pressure water jet cutting device, wherein the high-pressure water jet cutting device is configured to cut and thin cooling water sprayed from a nozzle directly above a rolled steel on a conveying roller bed of a steel hot-rolling production line, and the rolled steel serves as the object to be measured;
the method comprising the steps of:
  step 1. obtaining the two infrared radiation signals of different wavelengths and the visible light image signal of the object to be measured;
  step 2. processing the obtained two infrared radiation signals of different wavelengths and the visible light image signal; and
  step 3. detecting and processing an abnormally fluctuated temperature data.

17. The method according to claim 16, wherein the step 1 comprises:
  after the high-pressure water jet cutting device performs cutting and thinning on steam and a water layer, splitting the infrared radiation beam from the object to be measured into a transmitted beam and a reflected beam via the dual-wavelength beam splitting assembly, wherein the transmitted beam is received by a first radiation detector through a first monochromatic filter, the reflected beam is received by a second radiation detector through a second monochromatic filter, and two ways of electrical signals are obtained through photoelectric converters, and receiving the visible light image signal of the object to be measured by a camera sized to be placed in front of surface of the optical focusing assembly without hindering the optical focusing assembly from receiving the infrared radiation beam from the object to be measured.

18. The method according to claim 17, wherein the step 2 comprises:

performing ratio processing on the two infrared radiation signals of different wavelengths to obtain a ratio of optical radiation measurement signals (R(T)), calculating and obtaining a temperature data of the object to be measured according to formula (I):

$$R(T) = \frac{M(\lambda_1, T)d\lambda_1}{M(\lambda_2, T)d\lambda_2} = \frac{\varepsilon(\lambda_1, T)d\lambda_1}{\varepsilon(\lambda_2, T)d\lambda_2}\left(\frac{\lambda_2}{\lambda_1}\right)^5 e^{\left[\frac{c_2}{T}\left(\frac{1}{\lambda_2}-\frac{1}{\lambda_1}\right)\right]}, \quad \text{formula (I)}$$

wherein T is a temperature of the object to be measured, $\lambda_1$ is a center wavelength of the first monochromatic filter, $\lambda_2$ is a center wavelength of the second monochromatic filter, $C_2$ is a second radiation constant, $M(\lambda_1,T)$ and $M(\lambda_2,T)$ are respective radiances of the object to be measured at two wavelengths, $\varepsilon(\lambda_1,T)$ and $\varepsilon(\lambda_2,T)$ are respective emissivities of the object to be measured at two wavelengths, and $d\lambda_1$ and $d\lambda_2$ are respective bandwidths at two wavelengths;

then constructing a set of images of a surface of the object to be measured containing iron oxide scales, cracks, impurities, water vapor, and water mist, training an anomaly detection model, deploying the anomaly detection model in a processor, and performing analysis and anomaly detection on the obtained visible light image signal to determine whether an abnormal point or a disturbance is present on the object to be measured, and to provide a corresponding position and confidence.

19. The method according to claim 16, wherein the step 3 comprises:

when the temperature data is abnormally fluctuated, discarding abnormal temperature data if an abnormal point or a disturbance is present after image detection, or accepting data, and involving it in a subsequent model calculation believing that the temperature data can reflect the real condition of the temperature of the object to be measured if there is no abnormal point or disturbance.

* * * * *